United States Patent
Sennari et al.

[15] 3,670,053
[45] June 13, 1972

[54] PRODUCTION OF MODIFIED POLYPROPYLENES

[72] Inventors: Mutsuo Sennari; Toshihiro Nakajima, both of Yokkaichi-shi, Japan

[73] Assignee: Mitsubishi Petrochemical Company Limited, Tokyo-to, Japan

[22] Filed: Dec. 3, 1969

[21] Appl. No.: 881,911

[30] Foreign Application Priority Data

Dec. 10, 1968 Japan....................................43/89931

[52] U.S. Cl............................................260/878 B, 260/897
[51] Int. Cl. .......................................................C08f 15/04
[58] Field of Search................................................260/878 B

[56] References Cited

UNITED STATES PATENTS

| 3,301,921 | 1/1967 | Short | 260/878 B |
| 3,318,976 | 5/1967 | Short | 260/878 B |
| 3,354,239 | 11/1967 | Short | 260/878 B |
| 3,480,696 | 11/1969 | Hassell | 260/878 B |
| 3,378,607 | 4/1968 | Jones et al. | 260/878 B |
| 3,514,501 | 5/1970 | Leibson et al. | 260/878 B |

Primary Examiner—Harry Wong, Jr.
Attorney—Robert E. Burns and Emmanuel J. Lobato

[57] ABSTRACT

Heteroblock copolymers of propylene and ethylene containing an isotactic polypropylene segment and two copolymer segments in which the quantities of the three segments are specific, and in which the ethylene (polymerized) contents in the copolymer segments are specific, which heteroblock copolymers are produced by three successive steps of polymerization with the monomer feeds in specific mole ratios of $C_2/C_3$, the ratio being zero (zero $C_2$ quantity) for the first step.

2 Claims, No Drawings

PRODUCTION OF MODIFIED POLYPROPYLENES

BACKGROUND OF THE INVENTION

This invention relates generally to a process for producing polypropylene heteroblock copolymers which have high impact strength at lower temperature and high stiffness and other desirable properties such as good transparency in proper balance, and which are suitable for use for the production of injection moldings and extrusion blow moldings.

While isotactic polypropylenes are superior resin which are, in general, highly stiff, stretchable and heat-stable, they are deficient in impact strength, and it is difficult to use such materials for articles which are to be subjected to mechanical impact at temperatures lower than 0° C for example, which is a drawback characteristic of isotactic polypropylenes.

Some proposals have heretofore been made to improve the impact strength at low temperatures of these isotactic polypropylenes. As one of these proposals, it is known to cause propylene to undergo heteroblock copolymerization with another olefin such as ethylene or with a mixture of propylene and another olefin such as ethylene thereby to produce copolymers which are intrinsically impact-resistant at low temperatures. Such an approach for making "-polypropylenes" more impact-resistant is better than a method in which an agent for improving impact strength at low temperatures, such as polyisobutylenes, low density polyethylenes, and the like, is admixed or blended with polypropylenes thereby to produce blends, because the propylene heteroblock copolymers are more impact-resistant than the blends and because the heteroblock copolymers do not suffer degradation of surface condition thereof which often occurs in the case of blends.

Even the heteroblock copolymers, however, have some drawbacks. Problems of worse transparency, appearance of white lines when an article made of the heteroblock copolymer is bent, which phenomenon is hereinafter called "-crazing," degradation of surface condition of thin-walled injection moldings and extrusion blow and sheet moldings such as generation of opaque masses or spots or fish-eyes on the surface, and the like may sometimes arise. The stiffness of the heteroblock copolymers is also sometimes lower.

Since a contradictory relationship, in general, exists between these properties whereby improvement in a certain property will often result in degradation of another property, it is not easy to obtain polypropylene polymers which have high impact strength at low temperatures and still retain high stiffness as well good transparency with little crazing, and which can provide injection moldings and extrusion blow and sheet moldings having properties in proper balance.

SUMMARY OF THE INVENTION

It is an object of the present invention to provide a solution of these problems thereby to produce improved polypropylenes which are "total."

A more specific object of the invention is to provide a process for producing modified polypropylenes free from the above-described drawbacks which tend to be found in conventional heteroblock copolymers of propylene.

According to this invention, briefly summarized, there is provided a process for producing modified polypropylenes which comprises:

I. subjecting propylene to catalytic polymerization (1), thereby to produce isotactic polypropylene (A) which amounts to 20 to 75 percent by weight of the modified polypropylene to be finally produced, and II. subjecting the polymerization system of the step (I) to successive polymerization with a feed of a mixture of propylene and ethylene thereby to continue the polymerization of the step (I), which successive polymerization comprises polymerization (2) with a feed of a mixture of propylene and ethylene, the quantity of the ethylene being 0.2 to 10 mole percent of the propylene in the feed, thereby to produce an ethylene-propylene copolymer (B) which amounts to 20 to 65 percent by weight of the modified polypropylene to be finally produced, and polymerization (3) with a feed of a mixture of propylene and ethylene, the quantity of the ethylene being 20 to 60 mole percent of the propylene in the feed, thereby to produce an ethylene-propylene copolymer (C) which amounts to 2 to 35 percent by weight of the modified polypropylene to be finally produced, the total quantity of polymerized ethylene being 1.5 to 8 percent by weight of the modified polypropylene to be finally produced.

According to the process of this invention, there can be produced a heteroblock copolymer which comprises, in its ideal form, a segment A of isotactic polypropylene and segments B and C of ethylene-propylene copolymers in different ethylene (polymerized) contents wherein the sequential order of the segments can be A—B—C and A—C—B.

The heteroblock copolymer of the invention satisfactorily achieves the above objects. For example, as demonstrated in the following Table I, the modified polypropylenes of run numbers 3 through 7 have excellent brittle temperature and Charpy impact strength, even though they have a haze property comparable to that of the propylene homopolymer of Reference Example 1.

As far as we are aware, the heteroblock copolymers according to the invention appear to be superior to known heteroblock copolymers. One indication of this is that the modified polypropylenes of run number 1 through 7 in Table I, are free from the surface degradation and are better in the transparency and the crazing in comparison with the reference heteroblock copolymer in Reference Examples 3 which is produced by the known process of Japanese Patent Publication No. 1836/64. Another indication of the relative merit of the modified polypropylenes of the invention is that they have lower brittle temperatures and higher stiffness in comparison with the reference heteroblock copolymers of Reference Examples 4 and 5 which are produced by the known process of Japanese Patent Publication No. 11230/68, and which are alleged to produce a film of good transparency. Furthermore, the modified polypropylenes according to the present invention are superior in the brittle temperature and stiffness to the reference heteroblock copolymers of Reference Examples 2 and 6 which are produced by the known process of Dutch Pat. No. 6,706,747.

DETAILED DESCRIPTION

The modified polypropylenes according to the invention which are expected to have the above-stated characteristics have segments A, B, and C. The contents in the modified polypropylene of the segments based on the weight of the modified polypropylene produced are as follows:

1. Segment A.
   from 20, preferably 30, to 75 percent, more preferably from 40 to 70 percent.
2. Segment B.
   from 20 to 65 percent, preferably from 25 to 40 percent.
3. Segment C.
   from 2 to 35 percent, preferably from 5 to 15 percent.

The total amount of the polymerized ethylene in the modified polypropylene is 1.5 to 8 percent by weight. The contents of the polymerized ethylene in the segments B and C are, in general, 0.2 to 5 percent for B and 20 to 80 percent by weight for C based on the weight of copolymers of each segment when the mixtures of propylene and ethylene to be fed respectively to the polymerization steps (2) and (3) contain the prescribed quantities of ethylene, namely 0.2 to 10 mole percent for the copolymerization step (2) and 20 or preferably 30 to 60 mole percent for the step (3) both based on propylene in each mixture.

According to the invention it is required that the contents of the segments A, B, and C be in the prescribed range.

The influence of an increase and decrease in the contents of the segments on the properties or characteristics of the modified polypropylene product is, in general, as follows.

1. Segment A

The content of the segment A controls the stiffness of the product. The higher the content is, the more stiff will the product be.

Outside of the prescribed range, an excessively high content of the segment A will impair the characteristics of brittle temperature and Charpy impact strength, while an excessively low content will greatly impair the stiffness. When the content is too low, the resulting polymer slurry is too thick to be easily handled in commercial production.

2. Segment B.

An increase in the content of the segment B will provide the product with the improvements in the brittle temperature, the transparency and the crazing, while it will lower the stiffness. Outside of the prescribed range, an excessively high content of the segment B will impair the stiffness of the product and will produce a polymer slurry too thick to be easily handled, while an excessively low content will impair the characteristics of brittle temperature and Charpy impact strength.

3. Segment C.

An increase in the content of the segment C will provide the product with improvement in the brittle temperature, while it will impair the characteristics of the transparency and the crazing.

Outside of the prescribed range, an excessively high content will impair the surface properties in that the surface of an article of the product has less luster and a film of the product has opaque masses or spots like "fish-eyes." An excessively low content will impair the characteristics of the brittle point and Charpy impact strength.

The contents of the polymerized ethylene in each segments, which are controlled, in general, by the proper choice of a monomer feed having an ethylene content in the prescribed range, are also critical. First, the segment A should be substantially free of the polymerized ethylene. In the case where the segment A contains a substantial amount of the polymerized ethylene, the resultant products will suffer great impairment of the stiffness. The influences of the contents of the polymerized ethylene in the segments B and C are substantially identical with those of the contents of the segments B and C in the product. When the content of the segment B, for example, is too low, the resultant modified polypropylenes are less improved in the transparency and the crazing, and when the content is too high on the other hand, the modified polypropylenes are less stiff.

The monomer feeds for the polymerization steps (1), (2), and (3) have the following composition expressed in terms of the ratio of ethylene moles $C_2$ to propylene moles $C_3$ in the feed:

a feed 1 for step 1
$C_2/C_3 = 0$
a feed 2 for step 2
$C_2/C_3 =$ from 0.2 to 10, preferably from 2.0 to 4.5
a feed 3 for step 3
$C_2/C_3 =$ from 20 or preferably 30 to 60, preferably from 35 to 60.

It is intended, within the spirit or scope of the invention, that the composition of the feed for a given polymerization step be determined with consideration of the residual quantity or quantities of propylene and/or ethylene of a preceding polymerization step which is to be transferred to the succeeding step, unless the preceding polymerization system is vented or degassed prior to the beginning of the succeeding stage.

The modified polypropylenes according to the invention are heteroblock copolymers which comprise, in their ideal forms, segments A, B, and C. There may be produced, however, in the copolymerization steps (2) and (3), some homopolymers of ethylene and of propylene as well as block copolymers consisting of only two segments, for example, segments A and B, as is usual in conventional copolymerization. The modified polypropylenes according to the invention may have any melt indexes. The higher the melt index of the modified polypropylenes is, the higher will the brittle temperature thereof be, as is usual in polymers.

The process for producing these modified polypropylenes is essentially the same to those which are known for the productions of isotactic polypropylenes and of copolymers of propylene and ethylene with the use of so-called stereospecific catalyst capable of polymerizing propylene into isotactic polypropylenes, except that the polymerization is carried out stepwisely, and the ratios of ethylene/propylene in the feed mixtures for the polymerization steps (2) and (3) are controlled. The catalyst is also known as Ziegler or Ziegler-Natta type catalyst and consists, broadly, of two components system comprising a compound of a metal of Group IV-B, V-B, VI-B, or VIII of the Periodic Table, such as a compound of titanium preferably containing a halogen, and a Group I-III element or alloy or hydride or organic derivative having an organometallic bond, such as an organoaluminum compound.

Accordingly, propylene and a mixture of ethylene and propylene are subjected to polymerization in the presence of a conventional catalyst which comprises a combination of dialkylaluminum monohalide such as diethylaluminum chloride and titanium trihalide such as titanium trichloride which may be the result of reduction of titanium tetrachloride with an organoaluminum compound such as trialkyl aluminum, the total aluminum to titanium mole ratio being at least 1:1 and preferably in the range of up to 5:1, and, if desired, a third catalyst component or an agent for improving stereospecificity, in the presence of a solvent such as a non-polar solvent, e.g., a hydrocarbon, in the presence of a molecular weight regulator, which is optional, such as hydrogen, at a temperature of 0° to 100° C, preferably 50° to 80° C, and at a pressure of less than 30 atmospheres.

The polymerization steps (1) through (3) are not necessarily carried out under the same conditions, but can be carried out, if desired, under different conditions with respect to such variables as the polymerization temperature, pressure, and type of the catalyst (especially the type of the third component). Preferably, the polymerization step (1) is controlled to produce isotactic polypropylenes having melt indexes in the range of 0.2 to 30 at 230° C.

The polymerization step (1) can be followed either by step (2) or step (3). The polymerization steps can be carried out in a single reactor or in different or separate reactors and can be carried out by batchwise or continuous operation.

The present invention may be further illustrated by the following specific examples which are not to be taken as limiting the spirit or scope of the invention. The results obtained are tabulated in Tables 1, 2, and 3.

The characteristics of the products are determined by the following methods:

| | |
|---|---|
| Melt index, | A.S.T.M. D-1238-57T |
| Polymerized ethylene content, | Infra-red spectrum. The ethylene contents in the three segments are determined by calculation from the data of the ethylene contents found of the products of respective reactors and the data of the material balances. |
| Brittle temperature, | A.S.T.M. D-746 |
| Flexual stiffness, | A.S.T.M. D-747 (at angle of 30°) |
| Haze property *1, | A.S.T.M. D-1003 |
| Gloss *1, | J.I.S.*2 Z-8741 |
| Charpy impact, | A.S.T.M. D-256 (at 20°C) |
| Degree of crazing, | An injection-molded sheet of 80×80×2mm is clamped between two iron discs each having a hole of 70mm diameter, and a weight weighing 3Kg and having a hemispherical tip of 38mm diameter is dropped from a height of 50cm on the sheet through the hole. The diameter of the whitened area which appears on the sheet is determined to indicate the value of "crazing." |

*1 The haze property is determined as the indication of the transparency and the gloss both on a press-formed sheet of 1-mm. thickness.

*2 J.I.S. is the Japanese Industrial Standards, and the testing procedure of J.I.S. Z-8741 is substantially identical with A.S.T.M. D-2457 (at angle of 60°)

EXAMPLE I

Into a 150-liter stainless-steel reactor equipped with a stirrer, there are fed 11 l/hour of solvent heptane and 30 g/hour of a composite catalyst composed of diethylaluminum monochloride and titanium trichloride (A.A. grade). Into the reactor, propylene and hydrogen as a molecular weight regulator are introduced, and polymerization of the charge is carried out under a pressure of 6.5 kg/cm$^2$.G. thereby to produce a reaction product mass which contains approximately 10 to 30 percent by weight of the polymer.

The mass is then transferred to a second reactor of 150-liter capacity, in which propylene, and 0.3 to 3 mole percent of ethylene based on the total quantity of propylene are polymerized in the presence of hydrogen at a temperature of 65° C and a pressure of 5.0 kg/cm$^2$.G thereby to produce a reaction product mass which contains approximately 20 to 40 percent by weight of the polymer.

The mass is then transferred to a third reactor of 150-liter capacity, in which propylene and 3 to 15 mole percent of ethylene based on the total quantity of propylene are polymerized at a temperature within the reactor of 65° C, thereby to produce a reaction product mass which contains approximately 43 percent by weight of the polymer.

The mass in the third reactor is then discharged, and an alcohol is added thereto to stop further polymerization, the mass then being purified by a conventional method. The polymer thus produced is approximately 10 kg/hour.

The data of runs in which the contents of the segments and the contents of polymerized ethylene were varied are recorded in Table I.

The following reference experiments were also carried out for the sake of comparison, the results obtained being recorded in Table II.

REFERENCE EXAMPLE I

In the presence of the same catalyst as that of Example I, propylene was polymerized at 65° C, at 5 kg/cm$^2$.G and in the presence of hydrogen.

REFERENCE EXAMPLE II

Into a reactor of 3-liter capacity, 1.4 g of titanium trichloride and 2.8 g of diethylaluminum monochloride were introduced. A gaseous mixture of propylene and ethylene were then introduced together with a minor quantity of hydrogen into the reactor and polymerized therein at 4 kg/cm$^2$.G and at 65° C. The ethylene content ($C_2/C_2+C_3$) in the mixture was 3 mole percent.

When 400 g of the gaseous mixture had polymerized or copolymerized, 24 g of ethylene was further introduced at a rate of 3 g/min. into the reactor without discharge of any residual gas of the copolymerization thereby to polymerize at 65° C.

Upon completion of the introduction of 24 g of ethylene, the reactor was degassed and the resultant polymer was treated in a conventional manner.

REFERENCE EXAMPLE 3.

Into a reactor of 3-liter capacity, 1.6 l of solvent heptane, 1.4 g of titanium trichloride, and 2.8 g of diethylaluminum monochloride were introduced. Propylene and a minor quantity of hydrogen were then introduced into the reactor, in which 400 g of propylene was polymerized at 4 kg/cm$^2$.G and at 65° C.

Thereafter, without discharge of any residual gases out of the reactor, a mixture of propylene and ethylene was further introduced and polymerized at 4 kg/cm$^2$.G and at 65° C.

The quantity of the additional mixture fed is 95 g.

The propylene content ($C_3/C_2+C_3$) in the mixture was 67 mole percent.

REFERENCE EXAMPLES 4 and 5.

Into a reactor of 3-liter capacity, 1.6 l of solvent heptane, 1.4 g of titanium trichloride, and 2.8 g of diethylaluminum monochloride were introduced. Propylene and a minor quantity of hydrogen were then introduced into the reactor, in which 250 g of propylene was polymerized at 5 kg/cm$^2$.G and at 65° C.

Thereafter, without discharge of any residual gases out of the reactor, a gaseous mixture of propylene and ethylene, and hydrogen were further introduced and polymerized at 3 kg/cm$^2$.G and at 65° C. The propylene content ($C_2/C_2+C_3$) in the gaseous mixture was 92 mole percent.

When the quantity of the copolymer produced had amounted to 500 g, introduction of the gaseous mixture was stopped, and residual gases were vented off. Recovery of the polymeric product was carried out in a conventional manner.

The difference between Ref. Exs. 4 and 5 is only a difference in the quantities of hydrogen used.

REFERENCE EXAMPLE 6

Into a reactor of 3-liter capacity, 1.4 g of titanium trichloride, and 2.8 g of diethylaluminum monochloride were

TABLE I

| Run No. | Melt index | C2/C3 mole percent in the monomer feed | | | Polymerized ethylene content total in the final product in percent by weight | Segment content in the final product, percent by weight | | | Brittle temperature, °C. | Stiffness, kg./cm.$^2$ | Charpy impact strength at 20° C. kg.-cm./cm.$^2$ | Haze, percent | Gloss, percent | Crazing, cm. |
|---|---|---|---|---|---|---|---|---|---|---|---|---|---|---|
| | | Segment | | | | Segment | | | | | | | | |
| | | A | B | C | | A | B | C | | | | | | |
| 1 | 6.6 | 0 | 4.3 | 58.6 | 5.0 | 64 | 28 | 8 | −2 | 6,700 | 6 | 44 | 73 | 1.9 |
| 2 | 3.3 | 0 | 4.5 | 50.5 | 3.7 | 65 | 29 | 6 | −8 | 5,800 | 8 | 36 | 84 | 1.6 |
| 3 | 0.5 | 0 | 3.3 | 59.6 | 4.0 | 65 | 29 | 6 | −19 | 4,900 | 33 | 34 | 96 | 1.6 |
| 4 | 0.9 | 0 | 4.3 | 54.8 | 3.8 | 65 | 29 | 6 | −11 | 5,300 | 25 | 36 | 94 | 1.7 |
| 5 | 1.2 | 0 | 4.3 | 54.0 | 4.7 | 44 | 50 | 6 | −15 | 4,800 | 38 | 30 | 95 | 1.5 |
| 6 | 0.9 | 0 | 3.9 | 48.7 | 5.2 | 64 | 25 | 11 | −16 | 4,800 | 41 | 44 | 88 | 1.8 |
| 7 | 0.9 | 0 | 4.1 | 47.0 | 7.4 | 61 | 22 | 17 | −22 | 4,500 | 51 | 40 | 86 | 1.9 |

TABLE II

| Run No. | Melt index | Polymerized ethylene content, percent by weight | | | | Segment content in the final product, percent by weight | | | Brittle temperature, °C. | Stiffness, kg./cm.$^2$ | Charpy impact, at 20° C. kg.-cm./cm.$^2$ | Haze, percent | Gloss, percent | Crazing, cm. | Note |
|---|---|---|---|---|---|---|---|---|---|---|---|---|---|---|---|
| | | Segment | | | Final product | Segment | | | | | | | | | |
| | | A | B | C | | A | B | C | | | | | | | |
| 1 | 0.7 | 0 | 0 | 0 | 0 | 100 | 0 | 0 | +8 | 6,300 | 7 | 30 | 97 | Broken | (1) |
| 2 | 1.0 | 0 | 1.5 | 12.4 | 4.2 | 0 | 75 | 75 | −7 | 4,600 | 44 | 38 | 88 | 2.2 | (2) |
| 3 | 1.1 | 0 | 47.0 | | 4.2 | 91 | 9 | | −8 | 5,300 | 15 | 56 | 81 | 2.6 | (3) |
| 4 | 1.2 | 0 | 6.2 | | 3.1 | 50 | 50 | | −3 | 4,600 | 19 | 32 | 91 | 1.7 | (3) |
| 5 | 8.2 | 0 | 6.0 | | 3.0 | 50 | 50 | | +16 | 5,600 | 4 | 34 | 90 | 1.7 | (3) |
| 6 | 0.9 | 0 | | | 2.2 | 0 | 100 | | −7 | 4,500 | 21 | 25 | 99 | 1.5 | (4) |

$^1$ Isotactic polypropylene, a homo polymer.
$^2$ Heteroblock copolymer having two ethylene-containing segments.
$^3$ Heteroblock copolymer having only one ethylene-containing segment.
$^4$ Random copolymer.

TABLE III

| Run No. | Item examined | Melt index | C2/C3 mole percent in the monomer feed Segment A | Segment B | Segment C | Segment content in the final product total Segment C | Polymerized ethylene content total in the final product in percent by weight | Segment content in the final product percent by weight Segment A | Segment B | Segment C | Brittle temperature, °C | Stiffness, kg/cm² | Charpy impact, at 20°C kg.-cm./cm² | Haze, percent | Gloss, percent | Crazing, cm. |
|---|---|---|---|---|---|---|---|---|---|---|---|---|---|---|---|---|
| 0 | Standard | 0.9 | 0 | 4.3 | 54.8 | 3.8 | 65 | 29 | 6 | −11 | 5,300 | 25 | 36 | 94 | 1.7 |
| A | Greater C2/C3 ratio in feed 1 | 0.9 | 1.5 | 3.4 | 51.3 | 4.4 | 63 | 30 | 7 | −12 | *4,100 | 25 | 32 | 94 | 1.5 |
| B | Greater C2 content of segment A | 0.9 | 0 | 4.1 | 53.8 | 4.1 | 80 | 14 | 6 | *−4 | *4,800 | *12 | *38 | 90 | 1.8 |
| C | Greater C2/C3 ratio in feed 2 | 0.9 | 0 | 1.6 | 50.5 | 3.2 | 62 | 31 | 7 | *−5 | 5,500 | *17 | 38 | 91 | 1.9 |
| D | Smaller C2/C3 ratio in feed 2 | 0.8 | 0 | 6.8 | 51.3 | 4.8 | 63 | 30 | 7 | −15 | *4,400 | 37 | *45 | *80 | 1.6 |
| E | Greater content of C2 in seg. B | 1.0 | 0 | 4.1 | 49.7 | 5.0 | 22 | 72 | 6 | −14 | *4,500 | 33 | 33 | 93 | 1.9 |
| F | Smaller content of C2 in seg. B | 0.9 | 0 | 4.2 | 26.6 | 2.7 | 62 | 31 | 7 | *−2 | 5,300 | *13 | 35 | 94 | 1.6 |
| G | Greater content of C2 in seg. C | 0.8 | 0 | 4.0 | 75.1 | 6.9 | 63 | 30 | 8 | −16 | *4,400 | 26 | *55 | *77 | *2.2 |
| H | Greater content of seg. C | 1.0 | 0 | 4.0 | 54.0 | 12.0 | 44 | 31 | 25 | −23 | *4,400 | 20 | *62 | *72 | *2.9 |

NOTE: Run No. 0 is a standard according to the invention. The symbol * indicates that the data is inferior to that of the standard.

introduced. A gaseous mixture of propylene and ethylene, and a minor quantity of hydrogen were introduced into the reactor, in which the propylene was polymerized at 5 kg/cm².G and at 55° C until the consumption of the gaseous mixture had amounted to 400 g. The ethylene content in the gaseous mixture was 5.3 mole percent.

EXAMPLE II.

This example will demonstrate that the quantitative conditions in the present invention are critical.

The procedures of Example 1 is substantially followed, and the results obtained are recorded in Table III.

What we claim is:

1. A process for producing a heteroblock copolymer of polypropylene which sequentially comprises two stages:

Stage I. catalytically polymerizing propylene at a polymerization temperature of 0° to 100° C and a polymerization pressure of not higher than 30 atmospheres and a catalyst comprising a titanium halogen compound and an organoaluminum compound to produce isotactic polypropylene which amounts to 40 to 70 percent by weight of the modified polypropylene to be finally produced, Stage II. subjecting the resulting product of the stage I to successive polymerization under the above temperatures and pressures with a feed of a mixture of propylene and ethylene thereby to continue the polymerization of the Stage I, which successive polymerization comprises further polymerizing under the same reaction conditions with a feed of a mixture of propylene and ethylene, the quantity of ethylene being 2.0 to 4.5 mole percent of the propylene in the feed to produce an ethylene-propylene copolymer which amounts to 25 to 40 percent by weight of the modified polypropylene to be finally produced, and still further polymerizing under the same reaction conditions with a feed of a mixture of propylene and ethylene, the quantity of the ethylene being 35 to 60 mole percent of the propylene in the feed to produce a second ethylene-propylene copolymer which amounts to 5 to 15 percent by weight of the modified polypropylene to be finally produced, the total quantity of polymerized ethylene being 1.5 to 8% by weight of the modified polypropylene to be finally produced.

2. A process for producing a heteroblock copolymer of polypropylene which sequentially comprises two stages:

Stage I. catalytically polymerizing propylene at a polymerization temperature of 0° to 100° C and a polymerization pressure of not higher than 30 atmospheres and a catalyst comprising a titanium halogen compound and an organoaluminum compound to produce isotactic polypropylene which amounts to 40 to 70 percent by weight of the modified polypropylene to be finally produced, Stage II. subjecting the resulting product of the Stage I to successive polymerization under the above temperatures and pressures with a feed of a mixture of propylene and ethylene thereby to continue the polymerization of the Stage I, which successive polymerization comprises further polymerizing under the same reaction conditions with a feed of a mixture of propylene and ethylene, the quantity of the ethylene being 35 to 60 mole percent of the propylene in the feed to produce an ethylene-propylene copolymer which amounts to 5 to 15 percent by weight of the modified polypropylene to be finally produced, and still further polymerizing under the same reaction conditions with a feed of a mixture of propylene and ethylene, the quantity of ethylene being 2.0 to 4.5 mole percent of the propylene in the feed to produce a second ethylene-propylene copolymer which amounts to 25 to 40 percent by weight of the modified polypropylene to be finally produced, the total quantity of polymerized ethylene being 1.5 to 8 percent by weight of the modified polypropylene to be finally produced.

* * * * *